(12) United States Patent
Lee et al.

(10) Patent No.: US 10,066,166 B2
(45) Date of Patent: Sep. 4, 2018

(54) COMPOSITION FOR ALIGNMENT LAYER, ARRAY SUBSTRATE FOR DISPLAY DEVICE COMPRISING THE SAME

(71) Applicant: Samsung Display Co. Ltd., Yongin, Gyeonggi-do (KR)

(72) Inventors: Taek Joon Lee, Hwaseong-si (KR); Oh Jeong Kwon, Hwaseong-si (KR); Dong Han Song, Hwaseong-si (KR); Ki Chul Shin, Seongnam-si (KR); Dong Chul Shin, Seoul (KR); Hyeok Jin Lee, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 273 days.

(21) Appl. No.: 15/048,643

(22) Filed: Feb. 19, 2016

(65) Prior Publication Data
US 2017/0066968 A1  Mar. 9, 2017

(30) Foreign Application Priority Data

Sep. 3, 2015 (KR) .................. 10-2015-0124691

(51) Int. Cl.
| | | |
|---|---|---|
| *C09K 19/56* | (2006.01) | |
| *C08G 73/10* | (2006.01) | |
| *B32B 27/34* | (2006.01) | |
| *B32B 7/14* | (2006.01) | |
| *G02F 1/1337* | (2006.01) | |
| *G02F 1/1339* | (2006.01) | |
| *G02F 1/1335* | (2006.01) | |

(52) U.S. Cl.
CPC .............. *C09K 19/56* (2013.01); *B32B 7/14* (2013.01); *B32B 27/34* (2013.01); *C08G 73/1025* (2013.01); *G02F 1/1339* (2013.01); *G02F 1/133512* (2013.01); *G02F 1/133514* (2013.01); *G02F 1/133719* (2013.01); *G02F 1/133723* (2013.01); *B32B 2457/202* (2013.01); *Y10T 428/10* (2015.01); *Y10T 428/1005* (2015.01); *Y10T 428/1023* (2015.01)

(58) Field of Classification Search
CPC . C09K 19/56; G02F 1/1337; G02F 1/133711; G02F 1/133723; G02F 1/13378; G02F 1/133788; C08G 73/1025; C08G 73/1042; B32B 27/34; B32B 2457/202; Y10T 428/10; Y10T 428/1005; Y10T 428/1018; Y10T 428/1023
USPC ........ 428/1.1, 1.2, 1.25, 1.26; 349/123, 129, 349/130, 132; 522/164
See application file for complete search history.

(56) References Cited

U.S. PATENT DOCUMENTS

| | | | | |
|---|---|---|---|---|
| 2012/0092603 A1* | 4/2012 | Mizusaki | ............... | C08F 20/20 349/129 |
| 2012/0196054 A1* | 8/2012 | Lee | ............... | G02F 1/133788 428/1.26 |
| 2016/0170268 A1* | 6/2016 | Song | ............... | G02F 1/133707 349/123 |

FOREIGN PATENT DOCUMENTS

| | | |
|---|---|---|
| JP | 4928729 B2 | 2/2012 |
| JP | 2015031823 | 2/2015 |
| KR | 1020110111212 | 10/2011 |
| KR | 101265309 | 5/2013 |

* cited by examiner

*Primary Examiner* — Ruiyun Zhang
(74) *Attorney, Agent, or Firm* — Cantor Colburn LLP

(57) ABSTRACT

A composition for an alignment layer includes a polyimide-based compound including a polymerization initiator coupled to a side chain of the polyimide-based compound.

19 Claims, 12 Drawing Sheets

COMPOSITION FOR ALIGNMENT LAYER, ARRAY SUBSTRATE FOR DISPLAY DEVICE COMPRISING THE SAME

This application claims priority to Korean Patent Application No. 10-2015-0124691, filed on Sep. 3, 2015, and all the benefits accruing therefrom under 35 U.S.C. § 119, the contents of which in its entirety is herein incorporated by reference.

BACKGROUND

1. Field of the Invention

The present disclosure relates to a composition for an alignment layer, and an array substrate for a display device including the same.

2. Description of the Related Art

As multimedia technologies evolve, display devices are becoming more and more important. Currently, a variety of different types of display devices are being used such as, for example, liquid crystal display (LCD) devices, organic electroluminescent (EL) display devices, and the like.

An LCD device displays a desired image by applying an electric field to liquid-crystal directors having dielectric anisotropy which are injected between two substrates. The amount of light emitted from an external light source which passes through the substrates may be adjusted by varying the intensity of the electric field.

SUMMARY

Aspects of the present disclosure provide a composition for an alignment layer which is capable of achieving good adhesion between a sealant and the alignment layer of an array substrate in a display device.

Aspects of the present disclosure also provide an array substrate for a display device exhibiting good durability with a reduced bezel area.

According to an exemplary embodiment, there is provided a composition for an alignment layer including a polyimide-based compound and a polymerization initiator coupled to a side chain of the polyimide-based compound.

In an exemplary embodiment, an amount of the polymerization initiator in the composition may be about 10 weight percent (%) to about 60 weight %.

In an exemplary embodiment, the polyimide-based compound may include units derived from a diamine-based compound and a dianhydride compound.

In an exemplary embodiment, the composition may further include a crosslinking agent.

In an exemplary embodiment, a content of the crosslink agent in the composition may be between 1 weight % and 10 weight %.

In an exemplary embodiment, the polymerization initiator may be represented by Chemical Formulas 1 to 6:

[Chemical Formula 1]

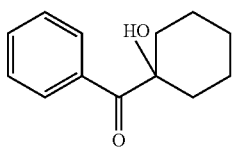

[Chemical Formula 2]

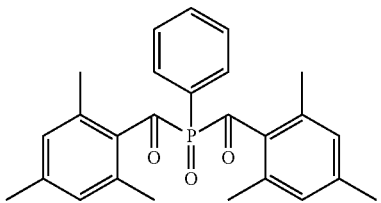

[Chemical Formula 3]

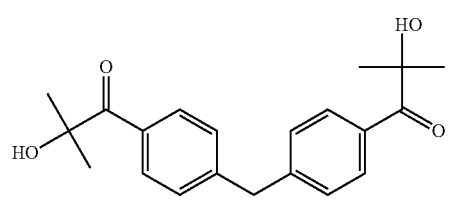

[Chemical Formula 4]

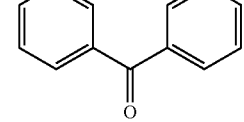

[Chemical Formula 5]

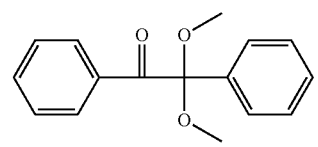

[Chemical Formula 6]

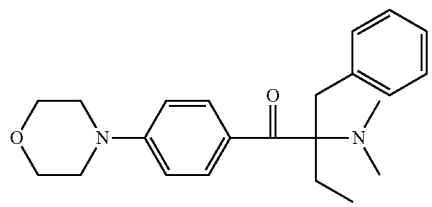

In an exemplary embodiment, the polyimide-based compound may be represented by following Chemical Formula 7:

[Chemical Formula 7]

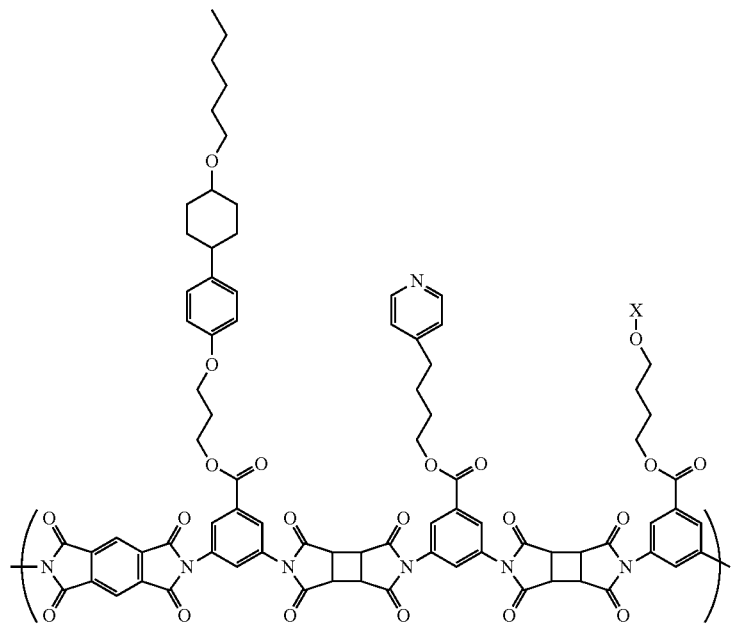

wherein X is the polymerization initiator of Chemical Formulas 1 to 6.

In an exemplary embodiment, the compound of Chemical Formula 7 may be represented by Chemical Formula 8:

[Chemical Formula 8]

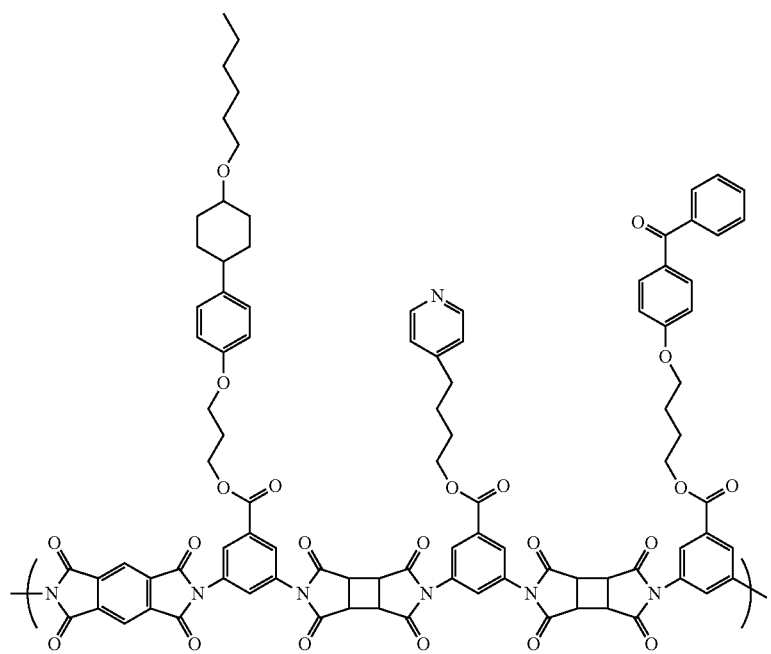

In an exemplary embodiment, the crosslinking agent may include at least one of an epoxy-based compound, a silane-based compound, and an organic peroxide-based compound.

According to an exemplary embodiment, there is provided an array substrate for a display device including a first substrate and a second substrate including a display area and a non-display area surrounding the display area, the first and second substrate facing each other; a liquid-crystal layer disposed between the first and second substrates; a lower alignment layer disposed on a face of the first substrate facing the second substrate; an upper alignment layer disposed on a face of the second substrate facing the first substrate; and a sealant disposed in the non-display area to seal the display area, wherein at least one of the upper alignment layer and the lower alignment layer include a composition including a polyimide-based compound and a polymerization initiator coupled to a side chain of the polyimide-based compound.

In an exemplary embodiment, at least one of the upper alignment layer and the lower alignment layer may further comprise a crosslinking agent.

In an exemplary embodiment, an amount of the crosslinking agent in the composition may be about 1 weight % and 10 weight %.

In an exemplary embodiment, at least one of the upper alignment layer and the lower alignment layer may be in contact with the sealant.

In an exemplary embodiment, at least a portion of the lower alignment layer may be disposed between the sealant and the first substrate.

In an exemplary embodiment, at least a portion of the upper alignment layer may be disposed between the sealant and the second substrate.

In an exemplary embodiment, the array substrate may further include a black matrix disposed between the lower alignment layer and the first substrate.

In an exemplary embodiment, the array substrate may further include a color filter disposed between the black matrix and the first substrate.

In an exemplary embodiment, the polymerization initiator may be represented by Chemical Formulas 1 to 6:

[Chemical Formula 1]

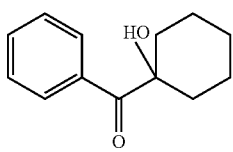

[Chemical Formula 2]

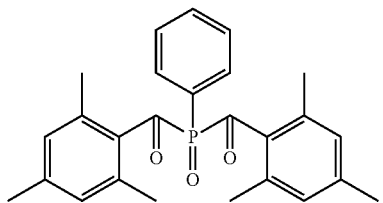

[Chemical Formula 3]

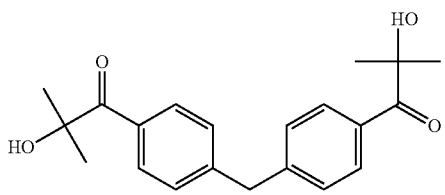

[Chemical Formula 4]

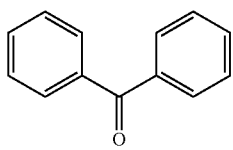

[Chemical Formula 5]

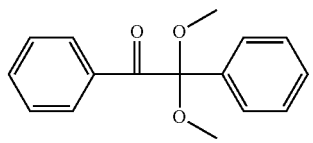

[Chemical Formula 6]

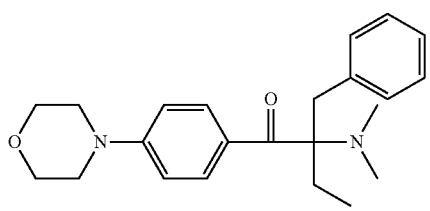

In an exemplary embodiment, the polyimide-based compound may be represented by Chemical Formula 7:

[Chemical Formula 7]

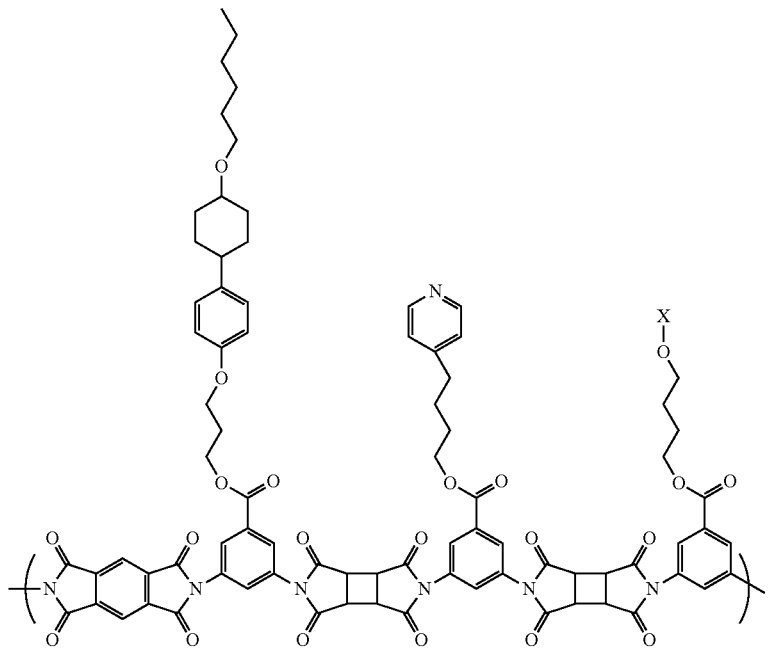

wherein X is the polymerization initiator of Formulas 1 to 6.

In an exemplary embodiment, the compound expressed in Formula 7 may be represented by Chemical Formula 8:

[Chemical Formula 8]

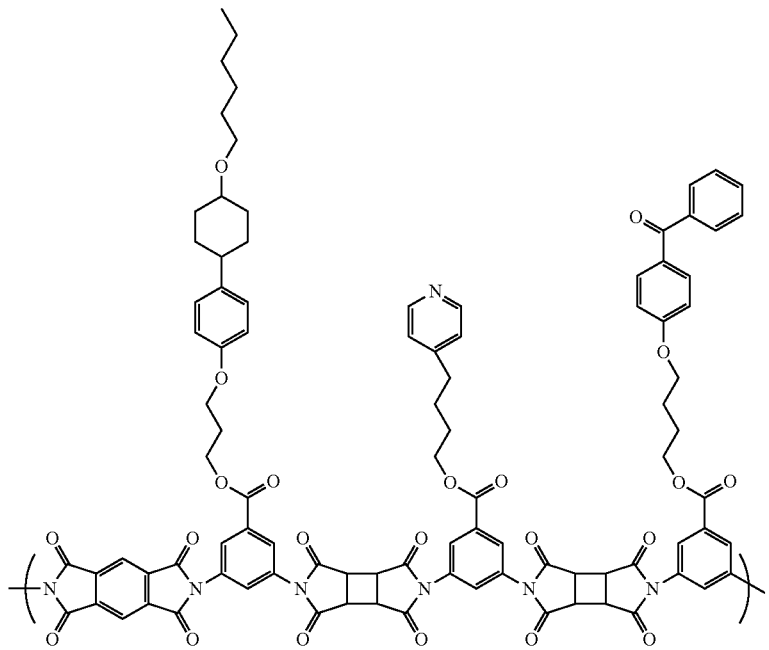

According to an exemplary embodiment, the following effects may be achieved:

An alignment layer composed of the exemplary compositions described herein exhibits good adhesion to a sealant of an array substrate in a display device.

In addition, an exemplary array substrate for a display device exhibits good durability and has a reduced bezel area.

It should be noted that effects of the present disclosure are not limited to those described above and other effects of the present disclosure will be apparent to those skilled in the art from the following descriptions.

BRIEF DESCRIPTION OF THE DRAWINGS

The above and other aspects and features of this disclosure will become more apparent by describing in further detail exemplary embodiments thereof with reference to the attached drawings, in which.

DETAILED DESCRIPTION

Figure 1:
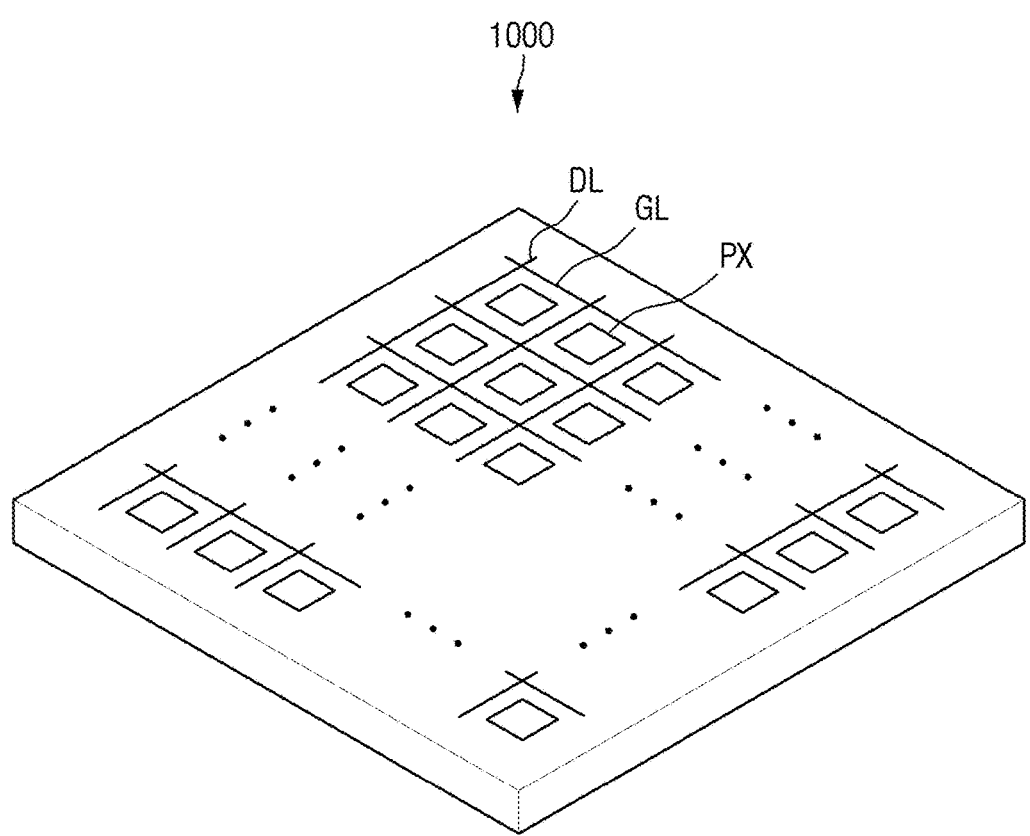
FIG. 1 is a perspective view of an exemplary embodiment of an array substrate for a display device.

Features of the invention and methods of accomplishing the same may be understood more readily by reference to the following detailed description of preferred embodiments and the accompanying drawings.

The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims.

In the drawings, the thickness of layers and regions are exaggerated for clarity. It will be understood that when an element or layer is referred to as being "on," "connected to," or "coupled to" another element or layer, the element or layer can be directly on, connected, or coupled to another element or layer or intervening elements or layers. In contrast, when an element is referred to as being "directly on," "directly connected to," or "directly coupled to" another element or layer, there are no intervening elements or layers present. As used herein, the term "connected" may refer to elements being physically, electrically and/or fluidly connected to each other.

As used herein, "coupled to" refers to covalent attachment (e.g. linkage) between two or more elements.

Like numbers refer to like elements throughout.

It will be understood that, although the terms first, second, third, etc., may be used herein to describe various elements, components, regions, layers and/or sections, these elements, components, regions, layers, and/or sections should not be limited by these terms. These terms are only used to distinguish one element, component, region, layer or section from another element, component, region, layer or section. Thus, a first element, component, region, layer or section discussed below could be termed a second element, component, region, layer, or section without departing from the teachings of the invention.

Spatially relative terms, such as "below," "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. "Or" means "and/or." As used herein, the term "and/or" includes any and all combinations of one or more of the associated listed items. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

An exemplary embodiment of a composition for an alignment layer includes a polyimide-based compound and a polymerization initiator coupled to a side chain of the polyimide-based compound. That is, the polymerization initiator may be covalently linked to a side chain of the polyimide-based compound. The polymerization initiator may be a photopolymerization initiator. The amount of polymerization initiator in the composition for an alignment layer may be about 10 weight % to about 60 weight % based on the total weight of the composition.

The composition, which includes a polymerization initiator coupled to a side chain of a polyimide-based compound, may allow one or more alignment layers to be tightly and firmly coupled to a sealant, which will be described in further detail below. In addition, the alignment layers are cured together with the sealant during the process of curing the sealant, and thus the durability of an array substrate for a display device can be enhanced. Further, an alignment layer composed of the composition is capable of being tightly and firmly coupled with the sealant, and as a result, a bezel area of the display device can be reduced.

The polyimide-based compound may include units derived from a diamine-based compound and a dianhydride compound. The composition for an alignment layer may further include a crosslinking agent. By including a crosslinking agent, the composition may improve the durability of an array substrate for a display device when an initiator is coupled to a side chain of the polyimide-based compound.

The amount of the crosslinking agent in the composition may be from about 1 weight % to about 10 weight %. An alignment layer produced with the composition having a crosslinking agent content in the above range can be firmly coupled with a sealant without losing the nature of the liquid-crystal orientation in the array substrate for a display device.

In some embodiments, the crosslinking agent may include at least one of an epoxy-based compound, a silane-based compound, and an organic peroxide-based compound. The epoxy-based compound may have an epoxy group coupled with a carboxylic acid. The silane compound may be, but is not limited to, one or more of N-(2-aminoethyl)-3-aminopropyl methyldimethoxysilane, N-(2-aminoethyl)-3-aminopropyltrimethoxysilane, 3-aminopropyltriethoxysilane, and bis-(trimethoxysilylpropyl)amine silane. The organic peroxide-based compound may be, but is not limited to, one or more of perbutyl peroxide (PBP, also known as di-tert-butyl peroxide), 2,5-dimethyl-2,5 di(tert-butylperoxy)hexane, 1,1-di(tert-butylperoxy)-3,3,5-tri-methylcyclohexane) and tert-butyl cumyl peroxide.

The polymerization initiator may have, but is not limited to, a structure of the following formulas:

[Chemical Formula 1]

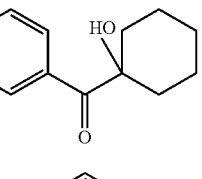

[Chemical Formula 2]

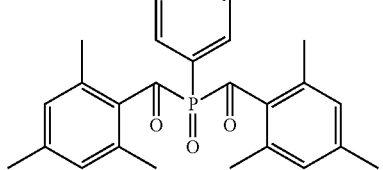

[Chemical Formula 3]

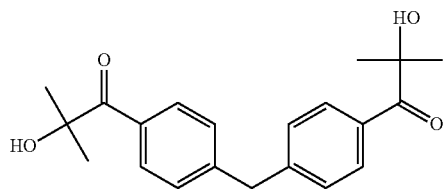

[Chemical Formula 4]

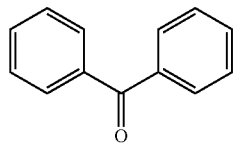

[Chemical Formula 5]

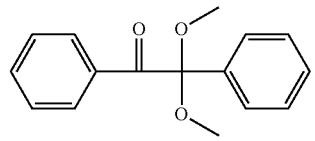

[Chemical Formula 6]

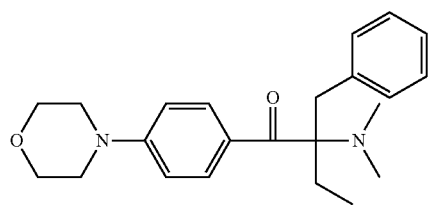

The polyimide-based compound in the composition for an alignment layer may be represented by Chemical Formula 7.

[Chemical Formula 7]

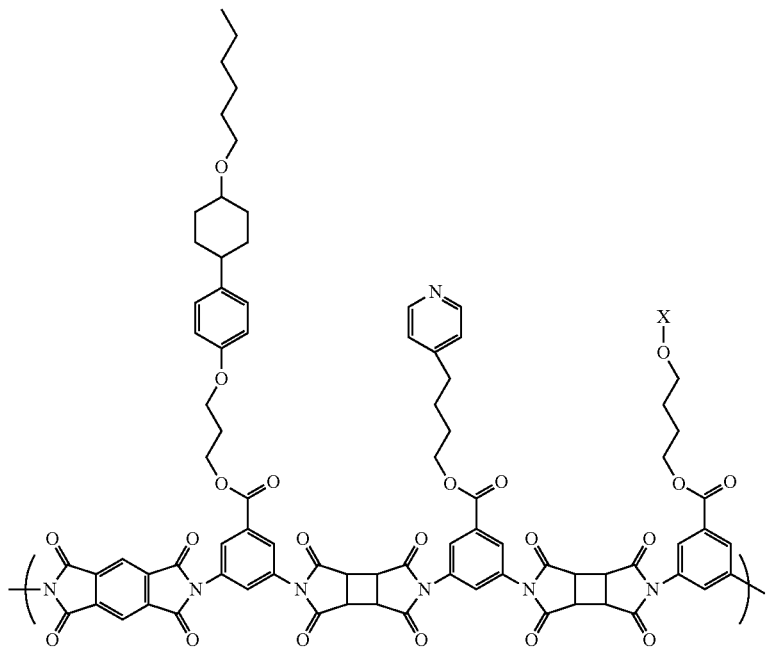

where X is of Formulas 1 to 6.

More specifically, the compound in Formula 7 may be represented by Chemical Formula 8.

[Chemical Formula 8]

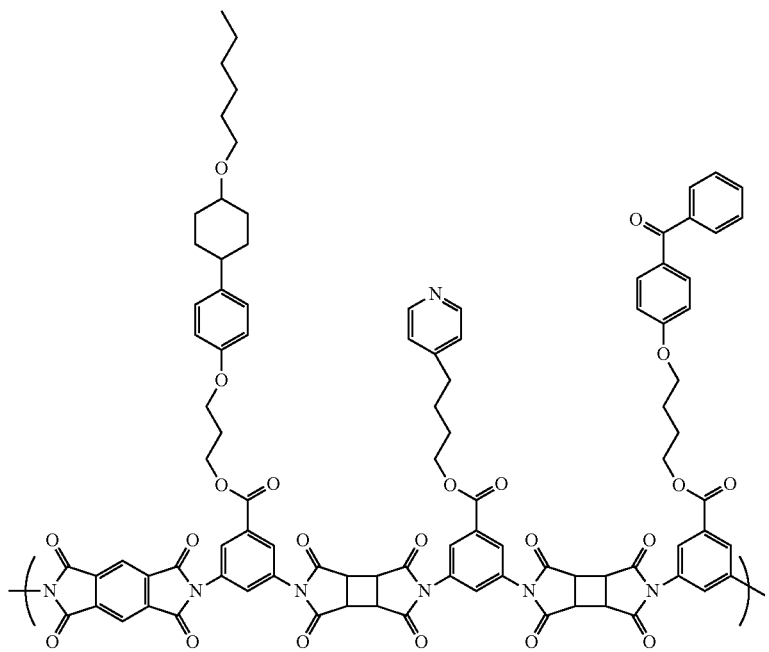

Hereinafter, exemplary embodiments of array substrates for a display device will be described with reference to the accompanying drawings.

FIG. 1 is a schematic perspective view of an exemplary array substrate for a display device.

Referring to FIG. 1, an exemplary embodiment of an array substrate 1000 for a display device may include a plurality of data lines DL, a plurality of gate lines GL and a plurality of pixels PX.

The plurality of gate lines GL may be arranged in rows with a designated spacing therebetween, and each of the gate lines GL may transmit a gate signal. The plurality of data lines DL may be arranged in columns with a designated spacing therebetween, and each of the data lines DL may transmit a data signal. The plurality of gate lines GL and the plurality of data lines DL may be disposed in a matrix. A pixel may be disposed at every intersection in the matrix. The gate signals and the data signals may be generated by an external device, and may have different voltage levels.

Each pixel PX may display one of the primary colors for color reproduction. Examples of the primary colors may include red, green, and blue. A pixel PX displaying red may be referred to as a red pixel, a pixel PX displaying green may be referred to as a green pixel, and a pixel PX displaying blue may be referred to as a blue pixel. A set of three pixels PXs having each of these colors may be referred to as a high-level pixel (not shown). In addition, a red pixel, a green pixel, and a blue pixel may be disposed alternately within a column or row. Alternatively, three pixels may form a triangle, with each pixel at one vertex. The arrangement of pixels is not limited to these and may include other various layouts.

Figure 2:
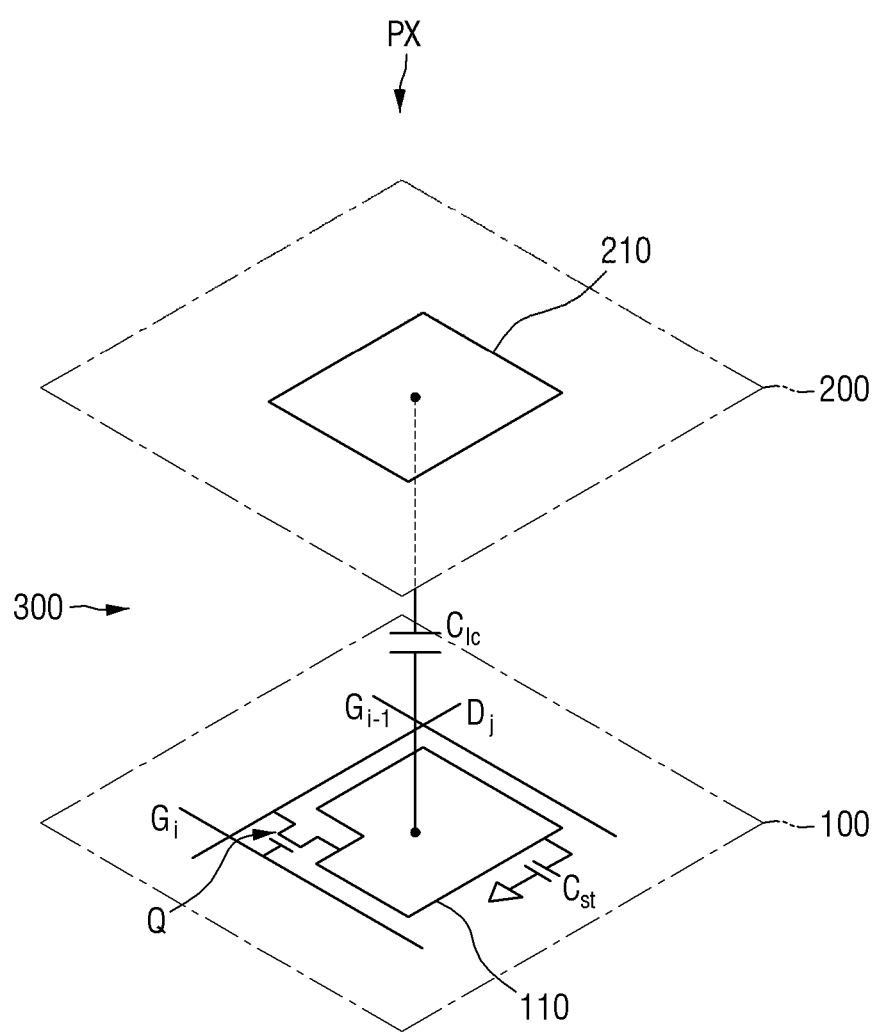
FIG. 2 is a view schematically showing an exemplary embodiment of the structure of a pixel.

FIG. 2 is a view schematically showing the structure of an exemplary embodiment of a pixel.

Referring to FIG. 2, a pixel PX may include a first substrate 100, a second substrate 200, and a liquid-crystal layer 300 filling the space therebetween. In addition, the pixel PX may include a switching element Q connected to a gate line GL and a data line DL. The switching element Q may be connected to a pixel electrode 110.

The pixel electrode 110 may form a liquid-crystal capacitor $C_{lc}$ with a common electrode 210 disposed on the second substrate 200. Further, the pixel electrode 110 may include a storage capacitor $C_{st}$. However, the storage capacitor $C_{st}$ is optional and may be eliminated in some implementations.

The switching element Q may be formed as a thin-film transistor disposed on the first substrate 100 having three terminals. The controller terminal may be connected to a gate line $G_i$. The input terminal may be connected to a data line $D_j$. The output terminal may be connected to the liquid-crystal capacitor $C_{lc}$ and the storage capacitor Cst.

The liquid-crystal capacitor $C_{lc}$ has two terminals: the pixel electrode 110 disposed on the first substrate 100 and the common electrode 210 disposed on the second substrate 200. The liquid-crystal layer 300 between the pixel electrode 110 and the common electrode 210 may function as a dielectric material. The pixel electrode 110 may be connected to the switching element Q. The common electrode 210 may be formed throughout the entire surface of the second substrate 200 and may receive a common voltage (Vcom).

The storage capacitor $C_{st}$ supplements the liquid-crystal capacitor $C_{lc}$ and may be formed by an additional signal line (not shown) on the first substrate 100 and the pixel electrode 110, with an insulative material therebetween. The additional signal line (not shown) may receive a predetermined voltage such as the common voltage (Vcom). Alternatively, the storage capacitor $C_{st}$ may be formed by the pixel electrode 100 and a gate line Gi−1 at the previous stage with an insulative material therebetween.

As described above with reference to FIG. 1, each pixel PX may display one of the primary colors for color reproduction, and a color filter (not shown) may be disposed on the first substrate 100 or the second substrate 200 for color reproduction.

Figure 3:
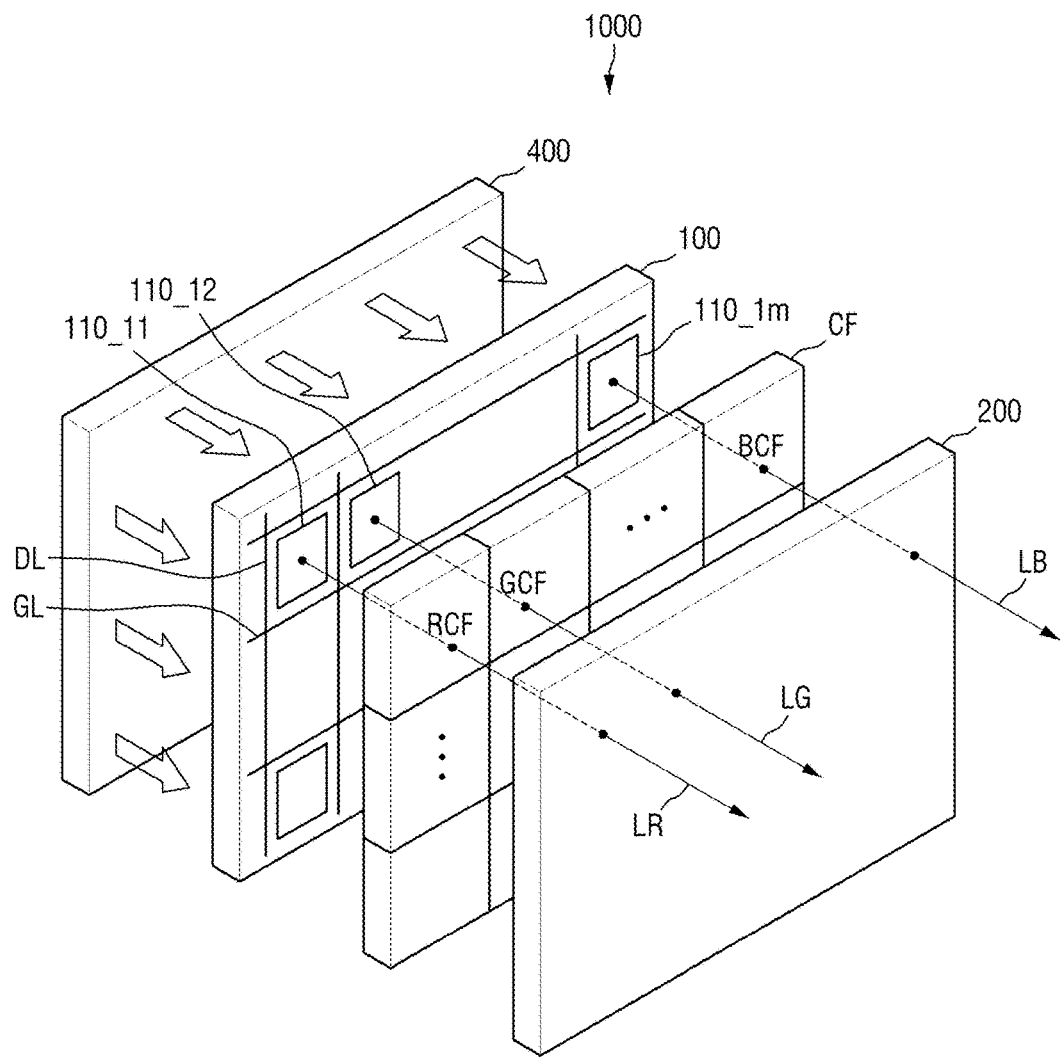
FIG. 3 is an exploded perspective view of an exemplary embodiment of an array substrate for a display device with a backlight unit coupled thereto.

FIG. 3 is an exploded perspective view of an exemplary embodiment of an array substrate for a display, with a backlight unit 400 coupled thereto.

Referring to FIG. 3, the array substrate 1000 for a display device may include a color filter layer CF between the first substrate 100 and the second substrate 200. In addition, a display device including the array substrate 1000 may include a backlight unit 400 behind the array substrate 1000.

The backlight unit 400 may emit light of white color having components of various wavelengths. The structure and shape of the backlight unit 400 are not limited to those depicted in FIG. 3. The light source for the backlight unit 400 may include various types of light sources such as cold cathode fluorescent lamps and light-emitting diodes. Other types of applicable light sources as well as the structure of the backlight unit are well known in the art; and thus are not described herein.

The color filter layer CF may include a one or more color filters such as a red color filter RCF, a green color filter GCF, and a blue color filter BCF. The light emitted from the backlight unit 300 includes a variety of different wavelengths and the color filters may only allow light having a particular wavelength to pass through, such that each pixel PX displays a particular color.

The color of one of the color filters RCF, GCF, and BCF of the color filter layer CF may be different from the color of the adjacent one. The layout and shape of color filters are not limited to those shown in FIG. 3 but may have various other layouts and shapes.

Each of the color filters RCF, GCF, and BCF of the color filter layer CF is disposed in the path of light that is emitted from the backlight unit 400 to pass through the respective pixel electrodes 110. Accordingly, different colors may be displayed on areas corresponding to different pixel electrodes 110. However, this is merely illustrative. A single color filter may cover an area where a plurality of pixels PX is located, or a plurality of color filters may be included in an area where a pixel PX is located.

Specifically, a first light LR emitted from the backlight unit 400 to be incident on a pixel electrode 110_11 located in the first row of the first column, may pass through a red color filter RCF disposed at the location corresponding to the location of the pixel electrode 110_11 and may be changed to a light containing mostly a red wavelength component. The light may pass through the second substrate 200 and may be perceived as a red color by an observer when she/he watches a completed display device.

Likewise, a second light LG emitted from the backlight unit 400 to be incident on a pixel electrode 110_12 located in the first row of the second column, may pass through a green color filter GCF disposed at the location corresponding to the location of the pixel electrode 110_11, and may be changed to a light containing mostly a green wavelength component. The light may pass through the second substrate 200, and may be perceived as green color by an observer when she/he watches a completed display device.

Likewise, a third light LB emitted from the backlight unit 400 to be incident on a pixel electrode 110_1m located in the first row of the $m^{th}$ column, may pass through a blue color filter BCF disposed at the location corresponding to the location of the pixel electrode 110_1m, and may be changed to a light containing mostly a blue wavelength component. The light may pass through the second substrate 200, and may be perceived as blue color by an observer when she/he watches a completed display device.

The shape of the color filters RCF, GCF, and BCF is not limited to a rectangular shape as shown in FIG. 3, but may have many different shapes. In addition, the boundaries between the color filters RCF, GCF, and BCF may be divided by curved lines instead of straight lines. Adjacent color filters may overlap with each other.

Figure 4:
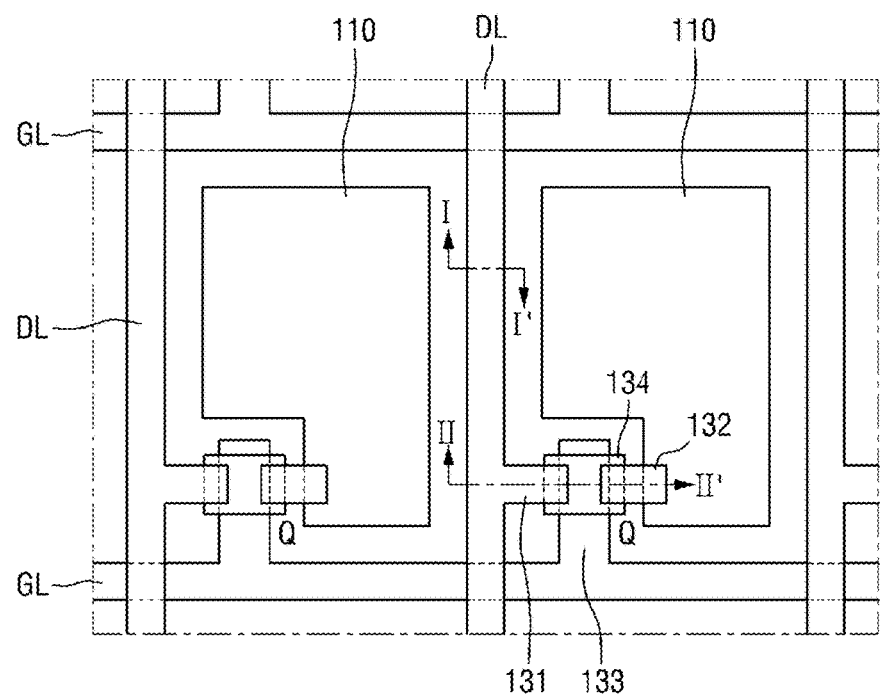
FIG. 4 is a plan view of an exemplary embodiment of an array substrate for a display device.

FIG. 4 is a plan view of a portion of an exemplary embodiment of a display area of an array substrate for a display device.

Referring to FIG. 4, an array substrate for a display device may include a plurality of data lines DL disposed on the first substrate 100 and extending in a first direction; a plurality of gate lines GL disposed on the first substrate 100 and extending in a second direction; a switching element Q electrically connected to the data line DL and the gate line GL; and a pixel electrode 110 connected to the switching element Q.

The first substrate 100 may be made of a transparent, insulative material. The data line DL may include a plurality of data electrodes 131. The gate line GL may include a plurality of gate electrodes 133. The switching element Q may be a thin-film transistor. Specifically, the data electrode 131 may be the source terminal of the switching element, the gate electrode 133 may be the controller terminal of the switching element, and a drain electrode 132 connected to the pixel electrode 110 may be the drain terminal of the switching element. The switching element Q may further include a semiconductor layer 134 that electrically connects the data electrode 131 to the drain electrode 132 depending on the voltage applied at the gate electrode 133.

In addition, the color filter layer CF, the common electrode 210 and the second substrate 200 may be disposed above the data line DL, the gate line GL, the switching element Q and the pixel electrode 110. More detailed descriptions thereof will be given with reference to FIG. 5.

Figure 5:
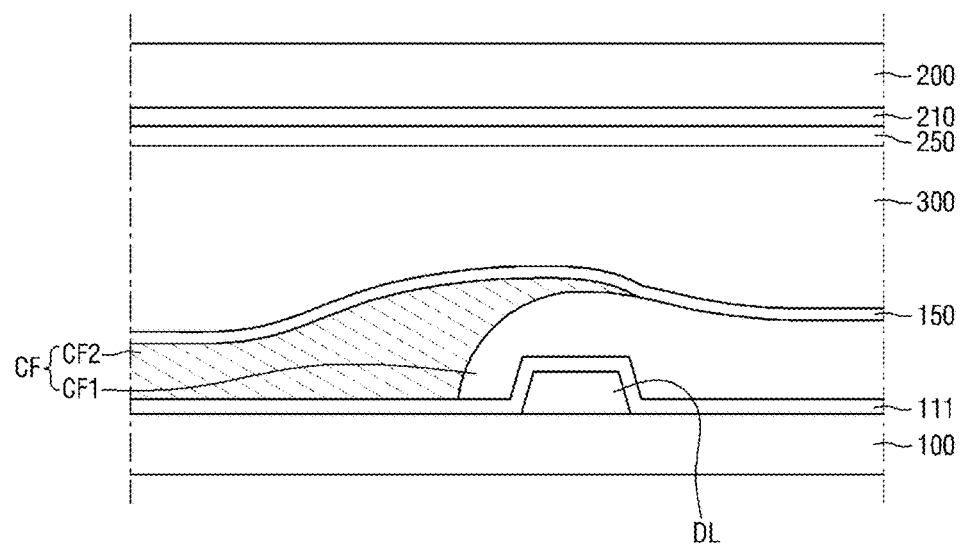
FIG. 5 is a cross-sectional view of an exemplary array substrate taken along line I-I' of FIG. 4.

FIG. 5 is a cross-sectional view of the array substrate shown in FIG. 4, taken along line I-I'.

Referring to FIG. 5, the data line DL may be formed on the first substrate 110. An insulation layer 111 may be formed on the data line DL as well as on portions of the first substrate 100 where no data line DL is formed. The insulation layer 111 may be, but is not limited to, a silicon oxide film, a silicon nitride film, or multiple layers thereof.

The color filter layer CF including a plurality of color filters CF1 and CF2 may be formed on the insulation layer 111. The plurality of color filters CF1 and CF2 may pass light having different wavelength ranges, respectively. As described above, light passing through different color filters may display different colors. The layout of the color filter layer CF is not limited to the above layout. Examples of various layouts will be described below.

A liquid-crystal layer 300 may be formed on the color filter layer CF. The liquid-crystal layer 300 may include a large number of liquid-crystal molecules. The liquid-crystal molecules may be aligned by the electric field applied across the liquid-crystal layer 300. In addition, the amount of light passing through the liquid-crystal layer 300 may be controlled by adjusting the orientation of the liquid-crystal molecules. As a result of the cooperation of the color filter layer CF and the liquid-crystal layer 300, a desired color can be displayed.

A common electrode 210 may be formed on the liquid-crystal layer 300 and under the second substrate 200. That is, the common electrode 210 may be formed on the surface of the second substrate 200 facing the first substrate 100. As described above, the common electrode 210 and the pixel electrode 110 together form a liquid-crystal capacitor $C_{lc}$, by which the liquid-crystal molecules may be controlled. An upper alignment layer 250 may be disposed across the entire surface of the common electrode.

The second substrate 200 may be formed on the common electrode 210 and may be made of a transparent material capable of transmitting light.

The color filter layer CF may include a first color filter CF1 and a second color filter CF2. The first color filter CF1 may be disposed on one side of the data line DL, and the second color filter CF2 may be disposed on the other side of the data line DL. In the example of FIG. 5, the first color filter CF1 is disposed on the right side of the data line DL, and the second color filter CF2 is disposed on the left side of the data line DL. In addition, the first color filter CF1 may be disposed extending from one side to the other side of the data line DL such that it overlaps the data line DL.

The first color filter CF1 and the second color filter CF2 may overlap each other over the data line DL. Since the first color filter CF1 and the second color filter CF2 may overlap each other, the portion above the data line DL where the color filters overlap may be higher than the other portions.

A lower alignment layer 150 may be disposed across the entire surface of the color filter layer CF. The lower alignment layer 150 may contain the exemplary composition for an alignment layer disclosed herein. That is, the lower alignment layer 150 may include a composition including a polyimide-based compound and a polymerization initiator coupled to a side chain of the polyimide-based compound.

Figure 6:
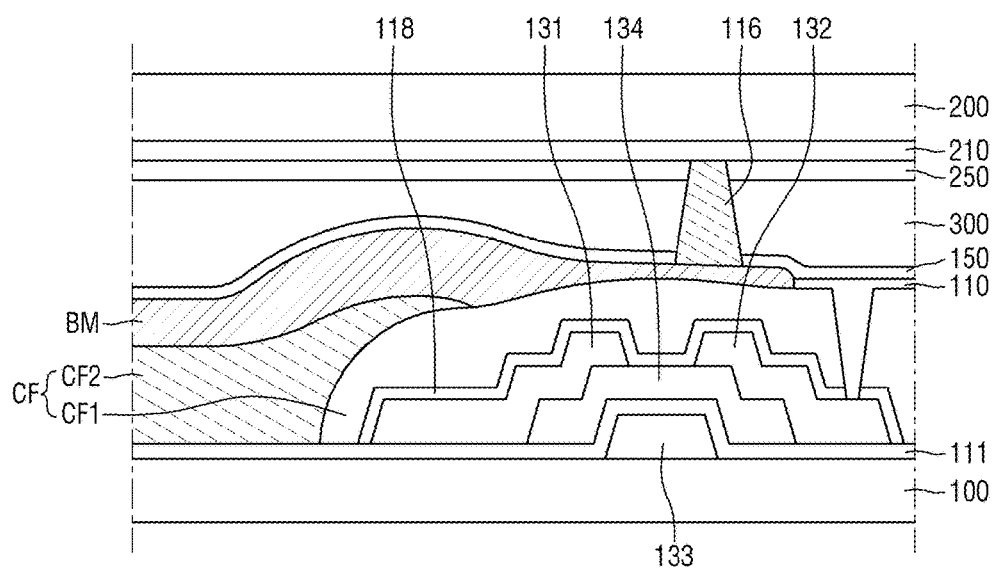
FIG. 6 is a cross-sectional view of an exemplary array substrate taken along line II-II' of FIG. 4.

FIG. 6 is a cross-sectional view of the array substrate shown in FIG. 4, taken along line II-II'.

Referring to FIG. 6, a switching element Q may be formed on the first substrate 110. In FIG. 6, a thin-film transistor is formed as the switching element Q.

Specifically, a gate line GL (not shown) may be formed on the first substrate 100. An insulation layer 111 may be formed on the gate line GL. As described above, the insulation layer 111 may be, but is not limited to, a silicon oxide film, a silicon nitride film, or multiple layers thereof.

A semiconductor layer 134 may be formed on the insulation layer 111. The semiconductor layer 134 may either allow or prohibit current flow depending on the voltage applied at the gate line GL.

A data electrode 131 and a drain electrode 132 may be formed on the semiconductor layer 134. The data electrode 131 may be extended from the data line DL and may provide a data signal from the data line DL to the semiconductor layer 134. An ohmic contact layer (not shown) may be formed between the data electrode 131 and the semiconductor layer 134 to facilitate the transfer of a data signal. One terminal of the drain electrode 132 may be connected to the semiconductor layer 134, and the other terminal of the drain electrode 132 may be connected to the pixel electrode 110, to provide a data signal from the semiconductor layer 134 to the pixel electrode 110. Similarly to the data electrode 131, an ohmic contact layer (not shown) may be formed between the drain electrode 131 and the semiconductor layer 134 to facilitate the transfer of a data signal.

A second insulation layer 118 may be formed on the data line DL, the data electrode 131, the semiconductor layer 134, and the drain electrode 132. The second insulation layer 118 may be, but is not limited to, a silicon oxide film, a silicon nitride film or multiple layers thereof.

The color filter layer CF including a plurality of color filters CF1 and CF2 may be formed on the switching element Q. The first and second color filters CF1 and CF2 may each pass light having different wavelength ranges, respectively. As described above, the wavelengths of light passing through the difference color filters CF1 and CF2 may display different colors.

A black matrix BM may be formed on the color filter layer CF. The black matrix BM may block light. The black matrix BM blocks the reflection of light from a variety of types of lines formed on the array surface 1000, so that the lines are not visible when viewed from the top of the array substrate 1000. The black matrix BM may overlay a variety of types of lines formed on the array substrate 1000 so as to prevent color mixing and light blocking.

A lower alignment layer 150 may be disposed on the black matrix BM. The lower alignment layer 150 may contain the exemplary composition for an alignment layer disclosed herein.

A column spacer 116 may be formed on the black matrix BM. The column spacer 116 may support the second substrate 200. A column spacer 116 may be made of the same material as the black matrix BM. That is, the column spacer 116 and the black matrix BM may be formed together using the same material by applying a two-tone mask. In doing so, the column spacer 116 may be formed as a protruding portion from the black matrix BM. When the column spacer 116 is formed as a protruding portion from the black matrix BM, the lower alignment layer 150 may be formed on portions of the black matrix BM other than the location where the column spacer 116 is formed.

A liquid-crystal layer 300 may be formed on the lower alignment layer 150. As described above, the liquid-crystal layer 300 may include a large number of liquid-crystal molecules. The liquid-crystal molecules may be aligned by an electric field applied across the liquid-crystal layer 300. In addition, the amount of light passing through the liquid-crystal layer 300 may be controlled by adjusting the alignment of the liquid-crystal molecules. As a result of the cooperation of the color filter layer CF and the liquid-crystal layer 300, a desired color can be displayed.

Figure 7:
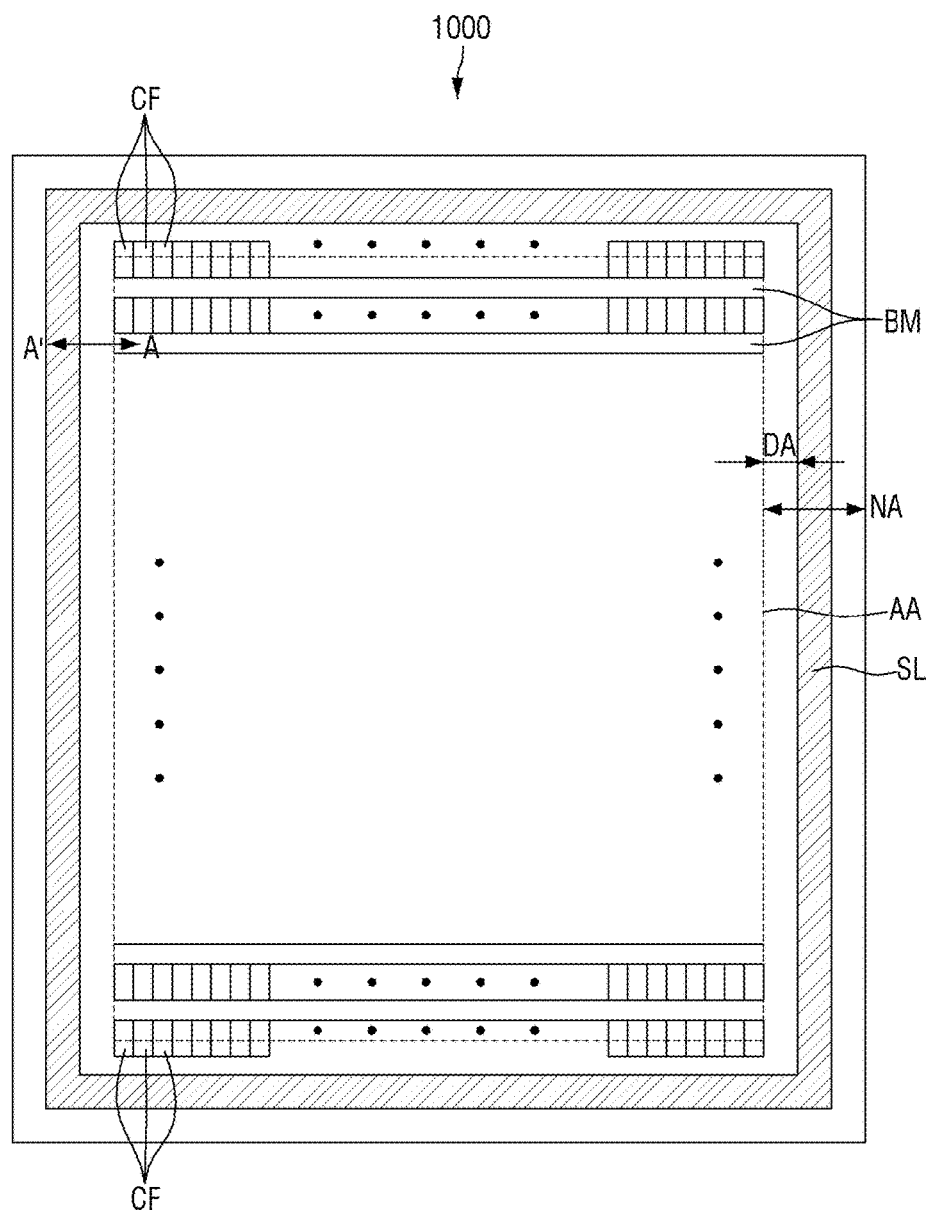
FIG. 7 is a plan view of an exemplary embodiment of an array substrate for a display device.

FIG. 7 is a plan view of an exemplary embodiment of an array substrate for a display device. Hereinafter, the exemplary array substrate for a display device will be described in detail with reference to FIGS. 3 and 7.

The array substrate includes first and second substrates 100 and 200 including a display area DA and a non-display area NA surrounding the display area DA. The first and second substrates 100 and 200 are facing each other, a liquid-crystal layer 300 disposed between the first and second substrates 100 and 200, a lower alignment layer 150 formed on a face of the first substrate 100 facing the second substrate 200, an upper alignment layer 250 formed on a face of the second substrate 200 facing the first substrate 100, and a sealant SL disposed in the non-display area NA to seal the display area AA. The upper alignment layer 250 and/or the lower alignment layer 150 may include the exemplary composition including a polyimide-based and a polymerization initiator coupled to a side chain of the polyimide-based previously described herein.

Figure 8:
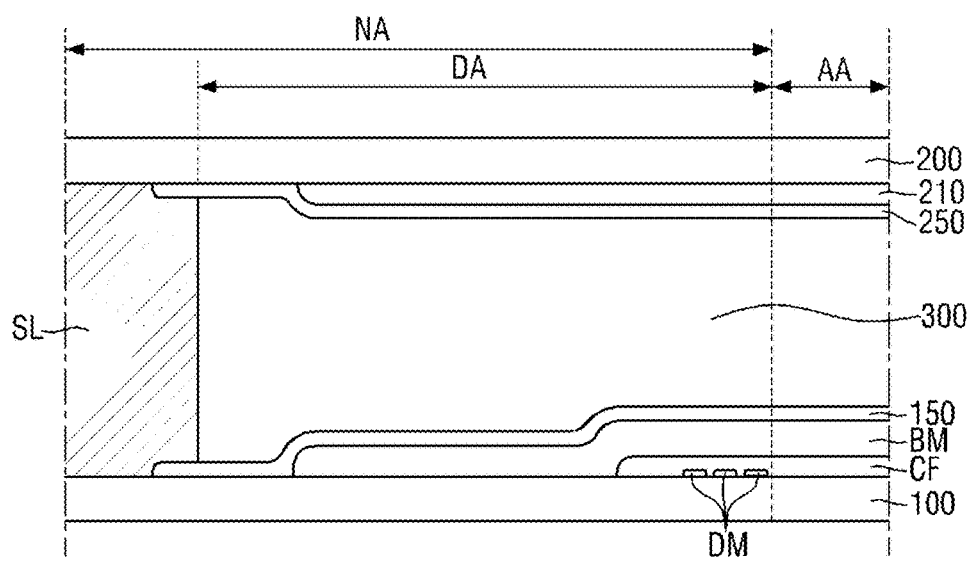
FIG. 8 is a cross-sectional view of an exemplary array substrate, taken along line A-A' of FIG. 7.

FIG. 8 is a cross-sectional view of the array substrate shown in FIG. 7 taken along line A-A'.

Referring to FIGS. 7 and 8, the array substrate may include a display area AA and a non-display area NA surrounding the display area AA. In addition, the non-display area NA may include a dummy area DA around the display area AA. The non-display area may also be referred to as a bezel area.

A sealant SL for attaching the first substrate 100 to the second substrate 200 and sealing them together may be included in the non-display area NA. The sealant SL may be formed along the peripheries of the first substrate and the second substrate, and may seal internal elements within the array substrate. In addition, the dummy area DA is formed in the non-display area NA. The dummy area DA is defined as the inner area relative to the sealant SL in the non-display area NA, i.e., the area between the sealant SL and the display area AA.

The array substrate includes first and second substrates 100 and 200 including a display area AA and a non-display area NA and facing each other, a color filter layer CF disposed on the first substrate 100, a black matrix BM disposed on the color filter layer CF, a lower alignment layer 150 disposed on the black matrix BM and above the color filter, and a liquid-crystal layer 300 disposed on the lower alignment layer 150.

A part of the color filter layer CF may be formed in the dummy area DA of the non-display area NA. Some dummy electrodes DM may be formed under the color filter layer CF in the dummy area DA. A part of the black matrix BM may be disposed on the color filter layer CF, and may be formed in both of the display area AA and the dummy area DA.

Figure 9:
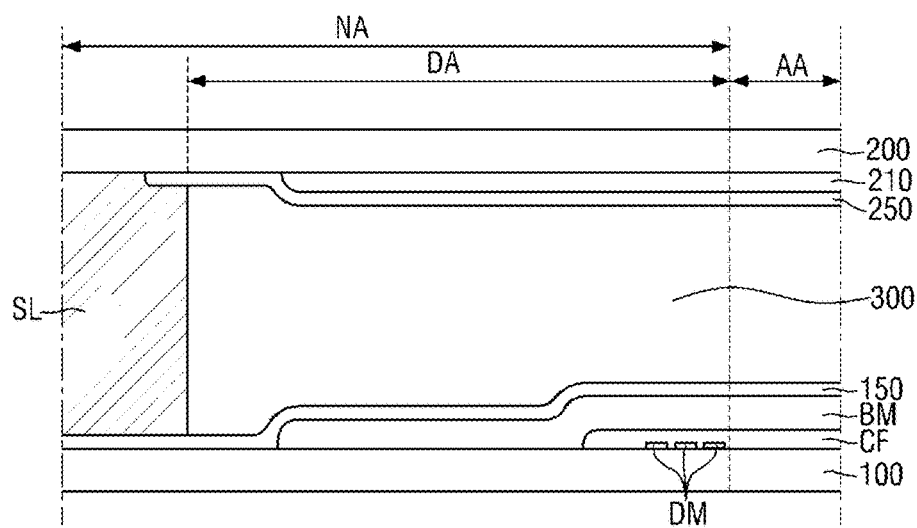
FIG. 9 is a cross-sectional view of another exemplary array substrate, taken along line A-A' of FIG. 7.

A portion of the lower alignment layer 150 may overlap the sealant SL. Specifically, the lower alignment layer 150 may overlap a portion of the sealant SL in the horizontal plane of the array substrate. However, as shown in FIG. 9 which is a cross-sectional view of another exemplary embodiment of an array substrate taken along line A-A' of FIG. 7, the sealant SL may be disposed completely on the lower alignment layer 150. That is, a part of the lower alignment layer 150 may be disposed on the first substrate 100, and the sealant SL may be disposed on the part of the lower alignment layer 150 on the first substrate 100. In other words, the sealant SL may not come into contact with the first substrate 100.

The black matrix BM and the color filter layer CF may be formed in the display area AA and the dummy area DA and may not formed in the area where the sealant SL is disposed. Accordingly, in the area where the sealant SL is disposed, only the lower alignment layer 150 may come in contact with the sealant SL.

By producing the lower alignment layer 150 using the exemplary composition for an alignment layer described above, adhesion between the lower alignment layer 150 and the sealant SL is enhanced so that the lower alignment layer 150 can be more firmly coupled to the sealant SL. Thus, regardless of whether the lower alignment layer 150 partially or completely overlaps the sealant SL, it is possible to prevent weakening of the seal between the first substrate 100 and the second substrate 200. In addition, since the above-described exemplary composition for an alignment layer contains a polymerization initiator coupled to a side chain of a polyimide-based compound, the lower alignment layer 150 and the sealant SL are polymerized together during the curing process of the sealant SL, and thus the lower alignment layer 150 can be firmly coupled to the sealant SL.

In addition, as described above, the composition for an alignment layer may further include a crosslinking agent. Thus, a crosslinking reaction between the lower alignment layer 150 and the sealant layer SL is facilitated, and accordingly, the lower alignment layer 150 can be more firmly coupled to the sealant SL.

Referring to FIG. 8, the upper alignment layer 250 of the array substrate is formed on the surface of the second substrate facing the first substrate 100. The upper alignment layer 250 may contain the composition for an alignment layer.

In addition, a portion of the upper alignment layer 250 may be disposed between the sealant SL and the second substrate 200. That is, similar to the lower alignment layer 150, the upper alignment layer 250 may overlap a portion of the sealant SL in the horizontal plane of the array substrate.

Figure 10:
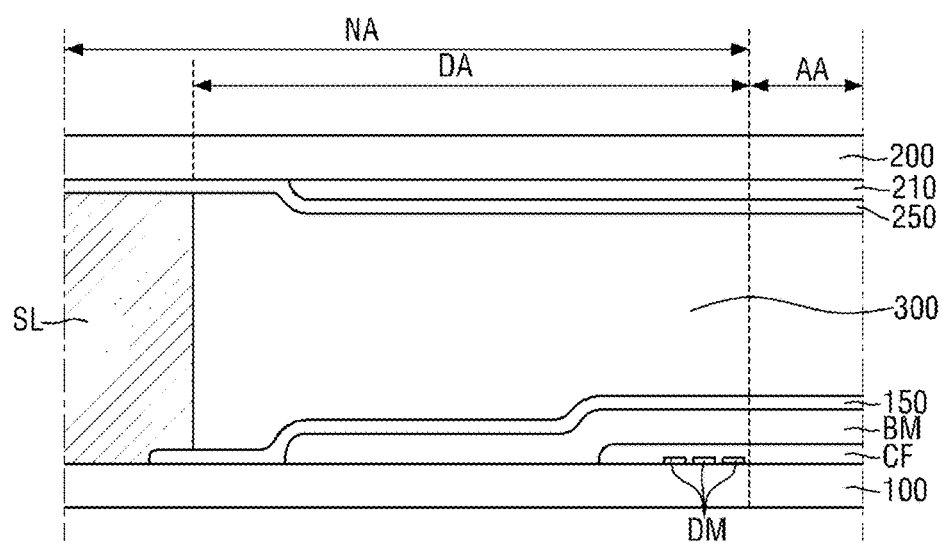
FIGS. 10 to 12 are cross-sectional views of alternative exemplary embodiments of an array substrate, taken along line A-A' of FIG. 7.

However, as shown in FIG. 10 which is a cross-sectional view of another exemplary embodiment of an array substrate taken along line A-A' of FIG. 7, the sealant SL may be disposed completely on the upper alignment layer 250. That is, a part of the upper alignment layer 250 may be disposed on the second substrate 200, and then the sealant SL may be disposed on the portion of the upper alignment layer 250. In other words, the sealant SL may not come into direct contact with the second substrate 200.

Figure 11:
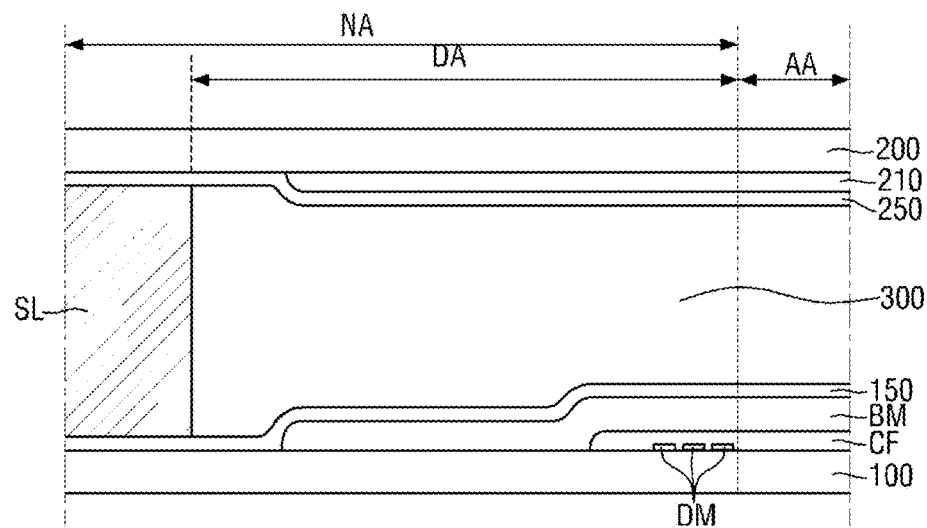

FIG. 11 is a cross-sectional view of yet another exemplary embodiment of an array substrate taken along line A-A' of FIG. 7. Referring to FIG. 11, both of the upper alignment layer 250 and the lower alignment layer 150 may completely overlap the sealant SL.

Figure 12:
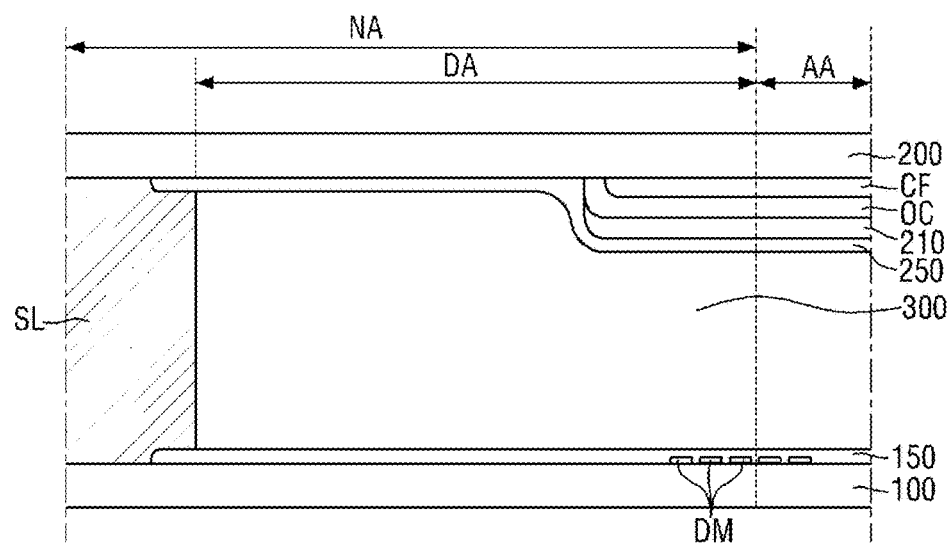

FIG. 12 is a cross-sectional view of still yet another exemplary embodiment of an array substrate taken along line A-A' of FIG. 7. Referring to FIG. 12, a color filter layer CF may be formed on a second substrate 200. In addition, an overcoat layer OC configured as a planarization layer (or the like) may be formed on the color filter layer CF. A common electrode 210 may be formed on the overcoat layer OC. An upper alignment layer 250 may be formed on the common electrode 210. In other words, the color filter layer CF may be formed on the surface of the second substrate 200 facing the first substrate 100, the overcoat layer OC may be formed on the color filter CF, the common electrode 210 may be formed on the overcoat layer OC, and then the upper alignment layer 250 may be formed on the common electrode 210.

A difference between the array substrate of FIG. 12 and the array substrates of FIGS. 8 to 11 is that the color filter CF is disposed on the upper substrate. When the color filter layer CF is disposed on the second substrate 200 as shown in FIG. 12, a black matrix (not shown) may be disposed between the color filter CF and a liquid-crystal layer 300. In addition, an upper alignment layer 250 and a lower alignment layer 150 may overlap a sealant 150 partially or completely.

The rest of the elements are identical to those described above, and thus will not be described to avoid redundancy.

The sealant SL is typically made of a UV-curable material, so that it may be cured by irradiating with ultraviolet light. The upper alignment layer 250 and/or the lower alignment layer 150 may be cured together with the sealant SL during the process of irradiating ultraviolet light, and thus the durability of the array substrate can be enhanced. As a result, no additional member for blocking an alignment layer is needed, so that the non-display area *i.e., a bezel area), also can be reduced While the invention has been particularly shown and described with reference to exemplary embodiments thereof, it will be understood by those of ordinary skill in the art that various changes in provide and detail may be made therein without departing from the spirit and scope of the invention as defined by the following claims. The exemplary embodiments should be considered in a descriptive sense only and not for purposes of limitation.

What is claimed is:

1. A composition for an alignment layer, the composition comprising:
a polyimide-based compound; and
a polymerization initiator coupled to a side chain of the polyimide-based compound,
wherein the polyimide-based compound is represented by following Chemical Formula 7:

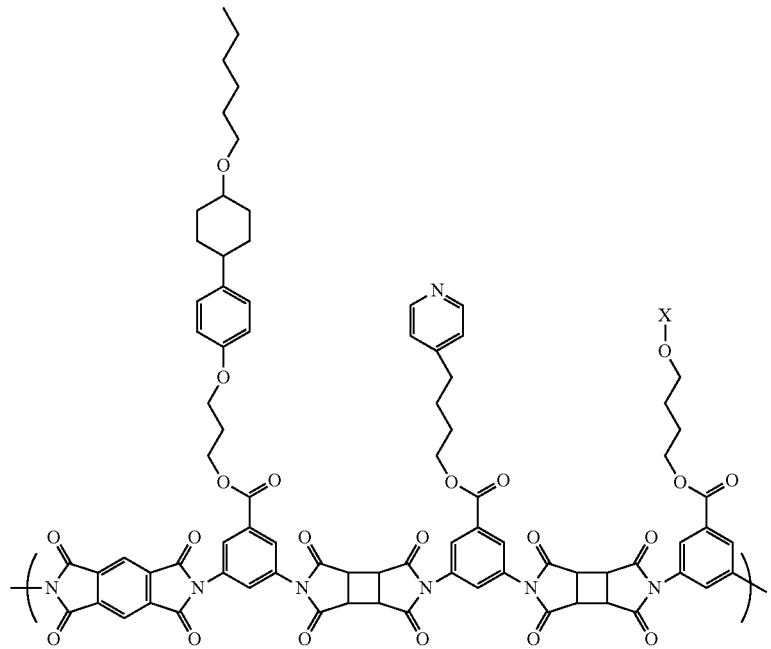

[Chemical Formula 7]

wherein X is the polymerization initiator.

2. The composition of claim 1, wherein an amount of the polymerization initiator in the composition is about 10 weight % to about 60 weight %.

3. The composition of claim 1, wherein the polyimide-based compound comprises units derived from a diamine-based compound and a dianhydride compound.

4. The composition of claim 1, further comprising a crosslinking agent.

5. The composition of claim 4, wherein an amount of the crosslinking agent in the composition is about 1 weight % to about 10 weight %.

6. The composition of claim 1, wherein the polymerization initiator is represented by Chemical Formulas 1 to 6:

[Chemical Formula 1]

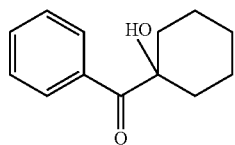

[Chemical Formula 2]

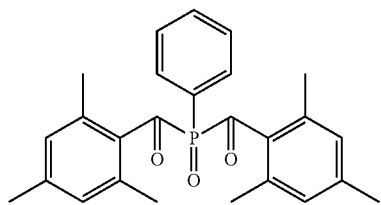

[Chemical Formula 3]

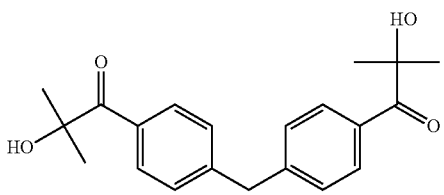

[Chemical Formula 4]

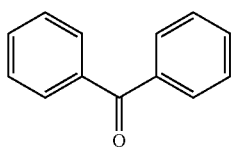

[Chemical Formula 5]

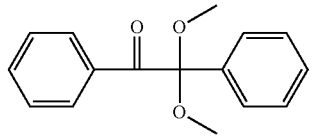

[Chemical Formula 6]

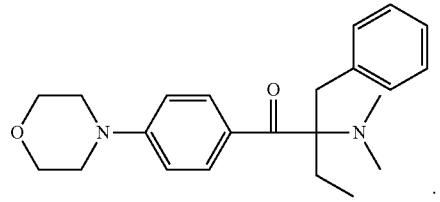

7. The composition of claim 1, wherein the compound of Chemical Formula 7 is represented by Chemical Formula 8:

[Chemical Formula 8]

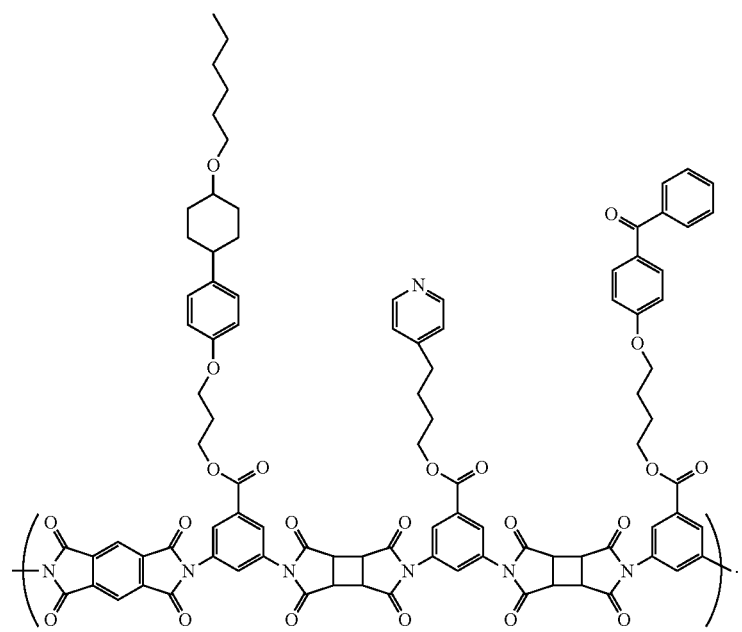

8. The composition of claim 4, wherein the crosslinking agent comprises at least one of an epoxy-based compound, a silane-based compound, and an organic peroxide-based compound.

9. An array substrate for a display device, comprising:
a first substrate and a second substrate comprising a display area and a non-display area surrounding the display area, the first and second substrate facing each other;
a liquid-crystal layer disposed between the first and second substrates;
a lower alignment layer disposed on a surface of the first substrate facing the second substrate;
an upper alignment layer disposed on a surface of the second substrate facing the first substrate; and
a sealant disposed in the non-display area and sealing the display area,
wherein at least one of the upper alignment layer and the lower alignment layer comprise a composition comprising a polyimide-based compound and a polymerization initiator coupled to a side chain of the polyimide-based compound, and
wherein the at least one of the upper alignment layer and the lower alignment layer alignment layer comprising the composition comprising the polyimide-based compound and the polymerization initiator coupled to a side chain of the polyimide-based compound is chemically covalently coupled to the sealant.

10. The array substrate of claim 9, wherein the composition further comprises a crosslinking agent.

11. The array substrate of claim 10, wherein an amount of the crosslinking agent in the composition is about 1 weight % to about 10 weight %.

12. The array substrate of claim 9, wherein at least one of the upper alignment layer and the lower alignment layer is in contact with the sealant.

13. The array substrate of claim 12, wherein at least a portion of the lower alignment layer is disposed between the sealant and the first substrate.

14. The array substrate of claim 12, wherein at least a portion of the upper alignment layer is disposed between the sealant and the second substrate.

15. The array substrate of claim 9, further comprising a black matrix disposed between the lower alignment layer and the first substrate.

16. The array substrate of claim 15, further comprising a color filter disposed between the black matrix and the first substrate.

17. The array substrate of claim 9, wherein the polymerization initiator is represented by Chemical Formulas 1 to 6:

[Chemical Formula 1]

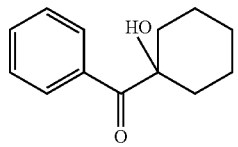

[Chemical Formula 2]

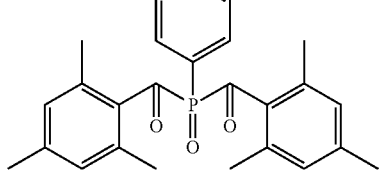

-continued

[Chemical Formula 3]

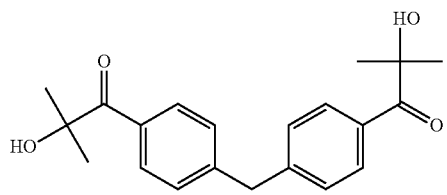

[Chemical Formula 4]

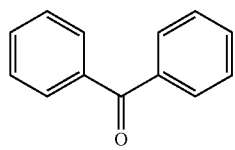

[Chemical Formula 5]

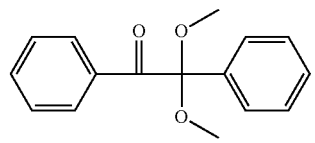

[Chemical Formula 6]

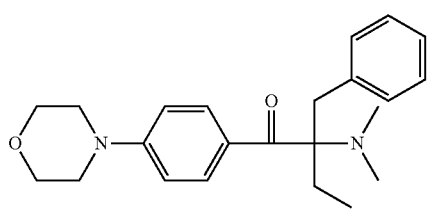

18. The array substrate of claim 17, wherein the polyimide-based compound is represented by Chemical Formula 7:

[Chemical Formula 7]
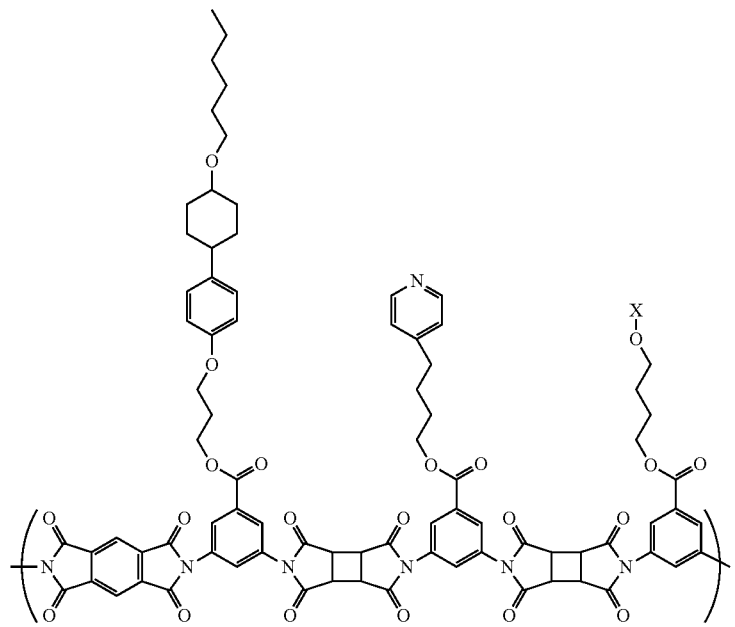
wherein X is the polymerization initiator of Chemical Formulas 1 to 6.
19. The array substrate of claim 18, wherein the compound of Chemical Formula 7 is represented by Chemical Formula 8:
[Chemical Formula 8]
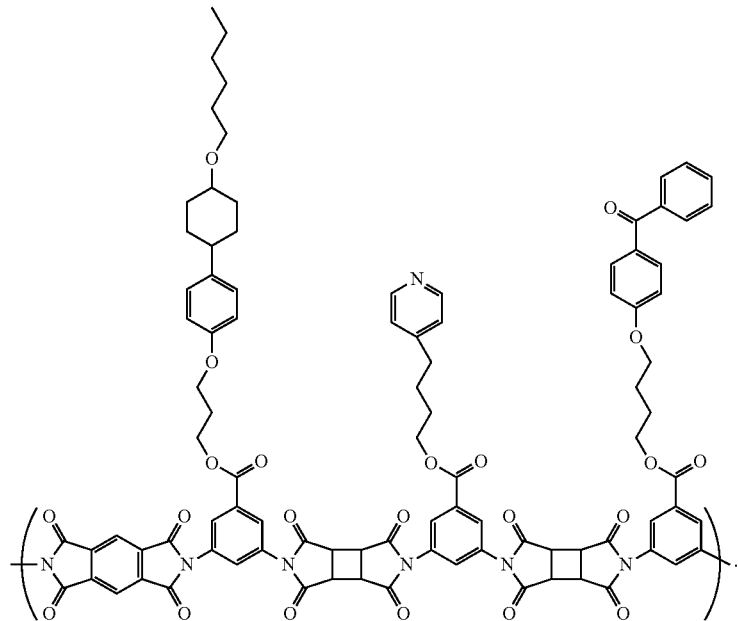
* * * * *